US009001918B2

(12) United States Patent  
Taori et al.

(10) Patent No.: US 9,001,918 B2  
(45) Date of Patent: Apr. 7, 2015

(54) COMMUNICATION METHOD AND APPARATUS IN A WIRELESS COMMUNICATION SYSTEM SUPPORTING MULTIPLE OFDM PARAMETERS SETS

(75) Inventors: Rakesh Taori, Gyeonggi-do (KR); Shuangfeng Han, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 23 days.

(21) Appl. No.: 13/594,370

(22) Filed: Aug. 24, 2012

(65) Prior Publication Data

US 2013/0051485 A1   Feb. 28, 2013

(30) Foreign Application Priority Data

Aug. 25, 2011   (KR) .................... 10-2011-0085042

(51) Int. Cl.
   *H04L 27/10*   (2006.01)
   *H04L 27/26*   (2006.01)

(52) U.S. Cl.
   CPC ........ *H04L 27/2646* (2013.01); *H04L 27/2626* (2013.01)

(58) Field of Classification Search
   USPC ................. 375/130–137, 259–267, 271–276, 375/278–285, 295–296, 302–305, 308, 316, 375/322–337, 340–350
   See application file for complete search history.

(56) References Cited

U.S. PATENT DOCUMENTS

| | | | |
|---|---|---|---|
| 6,078,622 A * | 6/2000 | Boytim et al. ................ 375/257 |
| 8,054,772 B1 * | 11/2011 | Upadhyay et al. ............ 370/312 |
| 2006/0087961 A1 * | 4/2006 | Chang et al. .................. 370/203 |
| 2008/0037679 A1 * | 2/2008 | Khan et al. .................... 375/267 |
| 2009/0175370 A1 * | 7/2009 | Kuroda et al. ................ 375/260 |
| 2010/0111014 A1 * | 5/2010 | Kang et al. ................... 370/329 |
| 2010/0149961 A1 * | 6/2010 | Lee et al. ...................... 370/204 |
| 2011/0032850 A1 * | 2/2011 | Cai .............................. 370/280 |
| 2011/0149912 A1 * | 6/2011 | Jung et al. .................... 370/331 |

* cited by examiner

*Primary Examiner* — Sam K Ahn  
*Assistant Examiner* — James M Perez  
(74) *Attorney, Agent, or Firm* — The Farrell Law Firm, P.C.

(57) ABSTRACT

A communication apparatus and method in a wireless communication system that support multiple Orthogonal Frequency Division Multiplexing (OFDM) parameter sets. A method includes determining a respective OFDM parameter set for each of multiple Radio Frequency (RF) chains; and processing an OFDM signal in each of the multiple RF chains based on a parameter value defined in the respective OFDM parameter set.

24 Claims, 5 Drawing Sheets

COMMUNICATION METHOD AND APPARATUS IN A WIRELESS COMMUNICATION SYSTEM SUPPORTING MULTIPLE OFDM PARAMETERS SETS

PRIORITY

The present application claims priority under 35 U.S.C. §119(a) to Korean Patent Application Serial No. 10-2011-0085042, which was filed in the Korean Intellectual Property Office on Aug. 25, 2011, the entire disclosure of which is hereby incorporated by reference.

TECHNICAL FIELD OF THE INVENTION

The present invention relates generally to a wireless communication system, and more particularly, to a communication method and apparatus in a wireless communication system supporting multiple Orthogonal Frequency Division Multiplexing (OFDM) parameter sets.

BACKGROUND OF THE INVENTION

In traditional OFDM/Orthogonal Frequency Division Multiple Access (OFDMA) systems, one set of OFDM parameters, for example, one Cyclic Prefix (CP) length, one subcarrier spacing, and one Fast Fourier Transform (FFT) size, is supported within one cell. The system informs Mobile Stations (MSs) about its OFDM configuration via a broadcast channel.

However, MSs within one cell may have different mobility conditions, from being static to highly mobile. For each mobility type, there is a set of OFDM parameters that is best suitable.

When an operator or a user wants to select only one subcarrier spacing, the subcarrier spacing should support mobility. Thus, when the single subcarrier spacing is used, the selected subcarrier spacing is much larger than is actually needed for low mobility. Further, the larger subcarrier spacing results in increased overhead due to an enlarged symbol duration.

SUMMARY OF THE INVENTION

The present invention is designed to address the above-discussed deficiencies of the prior art, and to provide at least the advantages described below.

An aspect of the present invention is to provide a communication system that supports multiple OFDM parameter sets in order to optimize system performance.

Another aspect of the present invention is to provide a method and an apparatus for communicating in a communication system that supports multiple OFDM parameter sets.

In accordance with an aspect of the present invention, a communication method in a wireless communication system that supports multiple OFDM parameter sets is provided. The method includes determining a respective OFDM parameter set for each of multiple Radio Frequency (RF) chains; and processing an OFDM signal in each of the multiple RF chains based on a parameter value defined in the respective OFDM parameter set.

In accordance with another aspect of the present invention, a communication apparatus is provided for a wireless communication system that supports multiple OFDM parameter sets. The apparatus includes a controller for determining a respective OFDM parameter set for each of a plurality of Radio Frequency (RF) chains; and the plurality of RF chains for processing an OFDM signal in each of the plurality of RF chains based on a parameter value defined in the respective OFDM parameter set.

In accordance with another aspect of the present invention, a communication method of a Base Station (BS) in a wireless communication system that supports multiple OFDM parameter sets is provided. The method includes determining multiple OFDM parameter sets to support in a cell; determining a default OFDM parameter set among the multiple OFDM parameter sets; providing information of the multiple OFDM parameter sets, using the default OFDM parameter set; receiving, from Mobile Stations (MSs), information of at least one of the multiple OFDM parameter sets selected by the MSs; and determining OFDM parameter sets for multiple Radio Frequency (RF) chains, based on the information of the at least one of the multiple OFDM parameter sets selected by the MSs.

In accordance with another aspect of the present invention, a communication method of an MS in a wireless communication system that supports multiple OFDM parameter sets is provided. The method includes determining a default OFDM parameter set; obtaining, from a Base Station (BS), information of multiple OFDM parameter sets to support in a cell, using the default OFDM parameter set; selecting at least one of the multiple OFDM parameter sets to support in the cell; and transmitting the selected at least one of the multiple OFDM parameter sets to the BS.

In accordance with another aspect of the present invention, a communication apparatus of a BS is provided for a wireless communication system that supports multiple OFDM parameter sets. The apparatus includes a controller for determining multiple OFDM parameter sets to support in a cell, and determining a default OFDM parameter set among the multiple OFDM parameter sets; a transmitter for providing information of the multiple OFDM parameter, using the default OFDM parameter set; and a receiver for receiving information of at least one of the OFDM parameter sets selected by Mobile Stations (MSs). The controller determines OFDM parameter sets for multiple Radio Frequency (RF) chains based on the information of the at least one of the OFDM parameter sets selected by the MSs.

In accordance with another aspect of the present invention, a communication apparatus of an MS is provided for a wireless communication system that supports multiple OFDM parameter sets. The apparatus includes a controller for determining a default OFDM parameter set, obtaining, from a Base Station (BS), information of multiple OFDM parameter sets to support in a cell, using the default OFDM parameter set, and selecting at least one of the multiple OFDM parameter sets to support in the one cell; and a transmitter for transmitting, to the BS, the selected at least one of the multiple OFDM parameter sets.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF THE INVENTION

Various embodiments of the present invention are described in detail below with reference to the accompanying drawings to assist in a comprehensive understanding of these embodiments of the present invention. Although the following description includes various specific details to assist in that understanding, these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the dictionary meanings, but, are merely used to enable a clear and consistent understanding of the invention.

In accordance with an embodiment of the present invention, a method and an apparatus are provided for communication in a wireless communication system supporting multiple OFDM parameter sets.

Herein, a millimeter Wave (mmWave) is classified as electromagnetic spectrum that spans between 30 GHz to 300 GHz, corresponding to wavelengths from 10 mm to 1 mm.

In Cellular Millimeter Wave (CMW) communication systems, it is feasible to deploy multiple sets of OFDM parameters in each cell, to efficiently utilize spectrum resources. That is, CMW communication systems feature a beam transmission (tx) that allows different sets of OFDM parameters for different users.

More specifically, in the CMW communication systems, a BS transmits a signal to an MS using a beamforming scheme for better link quality. Generally, the beamwidth is small (e.g., 10 degrees). Accordingly, the most suitable multiple access scheme is Time Division Multiple Access (TDMA). In each time slot, the BS transmits a signal to one MS using one beam. For different users, different OFDM parameters can be used to maximize DownLink (DL) throughput.

Figure 1:
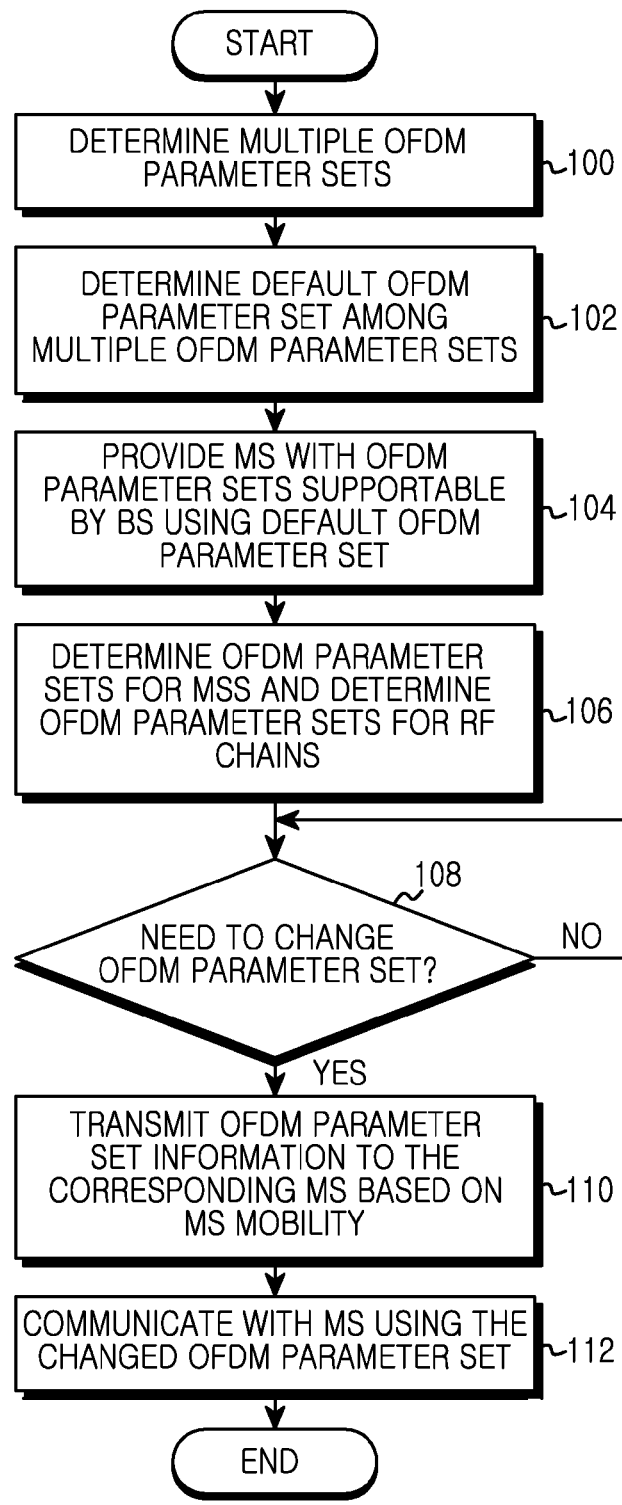
FIG. 1 is a flowchart illustrating BS operations for communicating in a wireless communication system supporting multiple OFDM parameter sets according to an embodiment of the present invention.

FIG. 1 is a flowchart illustrating BS operations for communicating in a wireless communication system supporting multiple OFDM parameter sets according to an embodiment of the present invention.

Referring to FIG. 1, the BS determines multiple OFDM parameter sets in step 100. For example, the BS may determine multiple OFDM parameter sets using a table, such as Table 1 below.

Further, the multiple OFDM parameter sets can be determined by an operator or by the BS by collecting and using statistical data of channel condition or statistical data of the MS mobility. One OFDM parameter set includes a Fast Fourier Transform (FFT) size, a Cyclic Prefix (CP) length, a subcarrier spacing, and a symbol duration, where each is mapped to one IDentifier (ID).

TABLE 1

| | | Nominal channel bandwidth, BW (MHz) | | | | |
|---|---|---|---|---|---|---|
| | | 5 | 7 | 8.75 | 10 | 20 |
| Sampling rate, n | | 28/25 | 8/7 | 8/7 | 28/25 | 28/25 |
| Sampling frequency, $F_s$ (MHz) | | 5.6 | 8 | 10 | 11.2 | 22.4 |
| FFT size, $N_{FFT}$ | | 512 | 1024 | 1024 | 1024 | 2048 |
| Subcarrier spacing, $\Delta f$ (kHz) | | 10.94 | 7.81 | 9.77 | 10.94 | 10.94 |
| Useful symbol time, $T_b$ (μs) | | 91.4 | 128 | 102.4 | 91.4 | 91.4 |
| CP ratio, G = 1/8 | OFDMA symbol time, $T_s$ (μs) | 102.857 | 144 | 115.4 | 102.857 | 102.857 |
| | FDD Number of OFDMA symbols per 5 ms frame | 48 | 34 | 43 | 48 | 48 |
| | Idle time (μs) | 62.857 | 104 | 46.40 | 62.857 | 62.857 |
| | TDD Number of OFDMA symbols per 5 ms frame | 47 | 33 | 42 | 47 | 47 |
| | TTG + RTG (μs) | 165.714 | 248 | 161.6 | 165.714 | 165.714 |

In step 102, the BS determines a default DL OFDM parameter set from the multiple OFDM parameter sets. The default DL OFDM parameter set is determined as the OFDM parameter set having the greatest subcarrier spacing among the multiple OFDM parameter sets. While the OFDM parameter set of the greatest subcarrier spacing increases overhead, i.e., decreases the symbol duration for the data transmission, the OFDM parameter set of the greatest subcarrier spacing will support all of the MSs.

In step 104, using the default DL OFDM parameter set, the BS provides information of the supportable OFDM parameter sets (e.g., OFDM parameter set IDs) to the MS. For example, the BS can broadcast the information of the supportable OFDM parameter sets to every MS in its cell using the default OFDM parameter set. Therefore, the information of the OFDM parameter sets supported by the BS can be included in basic capability support negotiation during network entry. Accordingly, both the MS and the BS can determine the OFDM parameter set to use by exchanging the supported OFDM parameter sets in the network entry.

In step 106, the BS determines OFDM parameter sets for the MSs and OFDM parameter sets for Radio Frequency (RF) chains of the MSs based on the mobility or the channel condition of the MS. For example, when the BS provides only one beam to one MS, the one MS includes only one RF chain. Therefore, one OFDM parameter set is applied to one MS or one RF chain.

Alternatively, when the BS provides multiple beams to one MS, the one MS includes multiple RF chains, i.e., one RF chain for each beam. Thus, multiple OFDM parameter sets are applied to the one MS and the corresponding OFDM parameter sets are respectively applied to the RF chains.

In step 108, the BS determines whether to change the OFDM parameter set, based on the mobility or the channel condition of the MS, which continuously varies over time. For example, the BS can determine whether to change the OFDM parameter set, based on DL channel measurement such as delay spread and Doppler spread or the MS mobility.

When the BS does not need to change the OFDM parameter set, operations continue with the same OFDM parameter set until a change is required.

When the BS determines to change the OFDM parameter set in step 108, the BS unicasts information of the changed OFDM parameter set to the MS in step 110.

In step 112, the BS communicates with the MS based on the changed OFDM parameter set.

Figure 2:
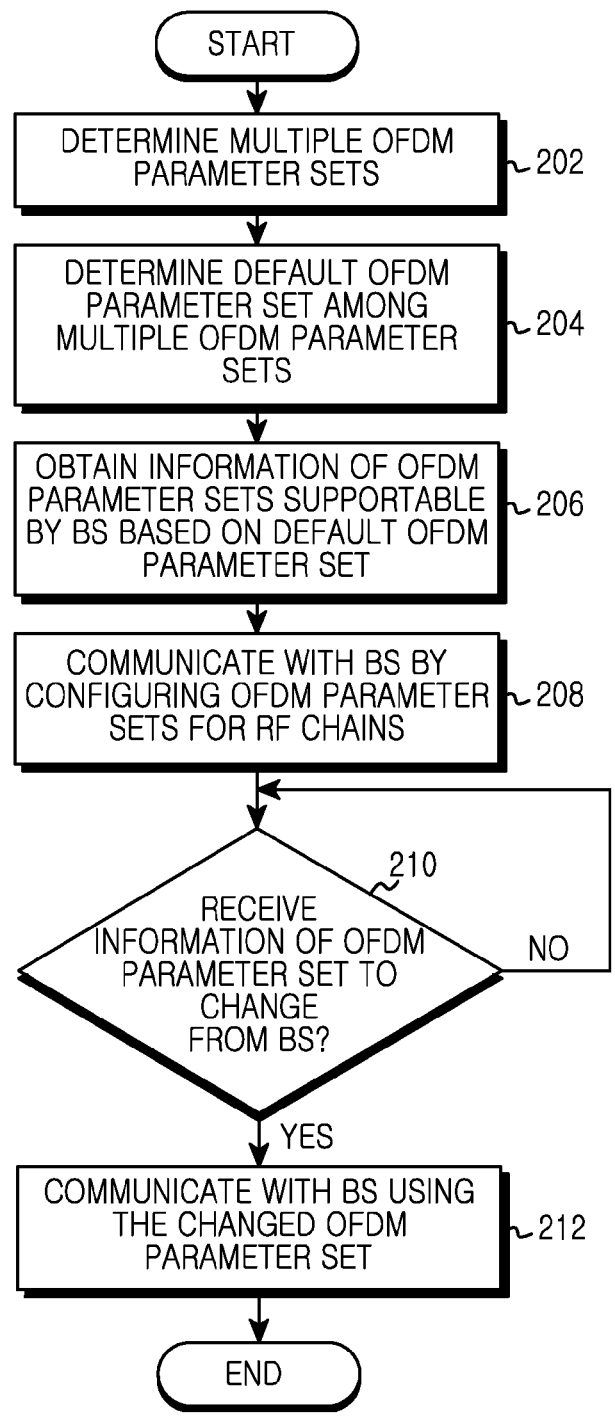
FIG. 2 is a flowchart illustrating MS operations for communicating in a wireless communication system supporting multiple OFDM parameter sets according to an embodiment of the present invention.

FIG. 2 is a flowchart illustrating MS operations for communicating in a wireless communication system supporting multiple OFDM parameter sets according to an embodiment of the present invention.

Referring to FIG. 2, in step 202, the MS determines multiple OFDM parameter sets, e.g., using Table 1. The multiple parameter sets can be determined by the operator or by the MS by collecting and using the statistical data of the channel condition or the statistical data of the moving speed.

In step 204, the MS determines a default UpLink (UL) OFDM parameter set from the multiple OFDM parameter sets. The default UL OFDM parameter set is determined as the OFDM parameter set having the greatest subcarrier spacing among the multiple OFDM parameter sets. Again, while the OFDM parameter set of the greatest subcarrier spacing increases the overhead, the OFDM parameter set of the greatest subcarrier spacing can be supported by all of the MSs.

The default DL OFDM parameter set of the BS can be the same as or different from the default UL OFDM parameter set of the MS.

In step 206, using the default UL OFDM parameter set, the MS obtains the information of the supportable OFDM parameter sets of the BS from the BS. For example, the MS receives the information of the supportable OFDM parameter sets of the BS over a broadcast channel using the default UL OFDM parameter set. Therefore, the information of the OFDM parameter sets supported by the BS can be included in the basic capability support negotiation during the network entry. Accordingly, both the MS and the BS can exchange the supported OFDM parameter sets in the network entry.

In step 208, the MS communicates with the BS by configuring the OFDM parameter sets for one or multiple RF chains based on the obtained OFDM parameter set information.

In step 210, the MS determines if information for an OFDM parameter set change is received from the BS.

When no information for an OFDM parameter set change is received from the BS, operations continue with the same OFDM parameter set until a change is required.

When information for an OFDM parameter set change is received from the BS, the MS communicates with the BS using the changed OFDM parameter set in step 212.

Figure 3:
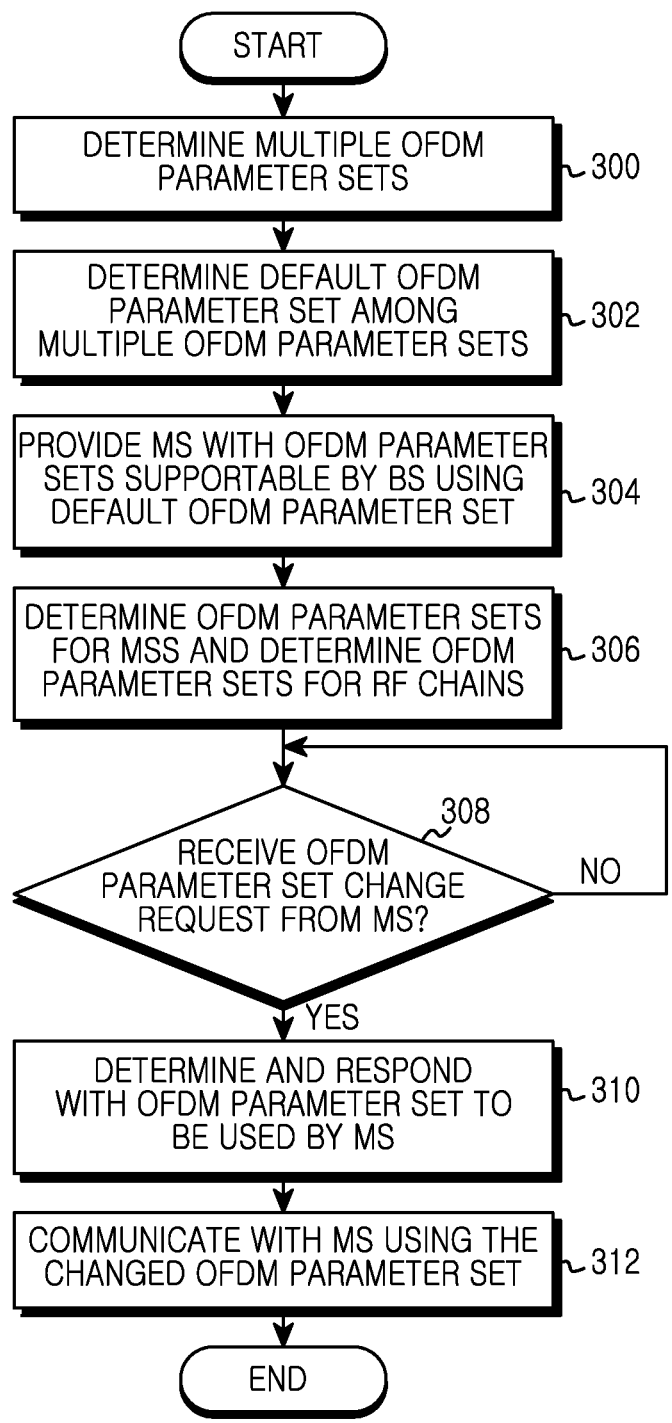
FIG. 3 is a flowchart illustrating BS operations for communicating in a wireless communication system supporting multiple OFDM parameter sets according to an embodiment of the present invention.

FIG. 3 is a flowchart illustrating BS operations for communicating in a wireless communication system supporting multiple OFDM parameter sets according to an embodiment of the present invention.

Referring to FIG. 3, in step 300, the BS determines multiple OFDM parameter sets, e.g., using Table 1. The multiple OFDM parameter sets can be determined by the operator or by the BS by collecting and using the statistical data of the channel condition or the statistical data of the MS mobility. One OFDM parameter set can include the FFT size, the CP length, the subcarrier spacing, and the symbol duration, where each is mapped to one ID.

In step 302, the BS determines a default DL OFDM parameter set from the multiple OFDM parameter sets. The default DL OFDM parameter set is determined as the OFDM parameter set having the greatest subcarrier spacing among the multiple OFDM parameter sets. While the OFDM parameter set of the greatest subcarrier spacing increases the overhead, the OFDM parameter set of the greatest subcarrier spacing can support all of the MSs.

In step 304, using the default DL OFDM parameter set, the BS provides information of the supportable OFDM parameter sets (e.g., OFDM parameter set IDs) to the MS. For example, the BS can broadcast the information of its supportable OFDM parameter sets to every MS in its cell using the default DL OFDM parameter set. Therefore, the information of the OFDM parameter sets supported by the BS can be included in the basic capability support negotiation during the network entry. Accordingly, both the MS and the BS can exchange their supported OFDM parameter sets in the network entry.

In step 306, the BS determines OFDM parameter sets for the MSs and OFDM parameter sets for RF chains of the MSs based on the mobility or the channel condition of the MS. For example, when the BS provides only one beam to one MS, the one MS includes only one RF chain. Therefore, one OFDM parameter set is applied to one MS or one RF chain.

Alternatively, when the BS provides multiple beams to one MS, the one MS includes multiple RF chains, i.e., one RF chain for each beam. Accordingly, the multiple OFDM parameter sets are applied to the one MS and the corresponding OFDM parameter sets are respectively applied to the multiple RF chains.

In step 308, the BS determines whether an OFDM parameter set change request is received from the MS.

When the BS does not receive an OFDM parameter set change request from the MS, operations continue with the same OFDM parameter set until a change is required.

When receiving an OFDM parameter set change request from the MS in step 308, the BS determines and responds with the OFDM parameter set to be used by the MS in step 310.

In step 312, the BS communicates with the MS using the changed OFDM parameter set.

Figure 4:
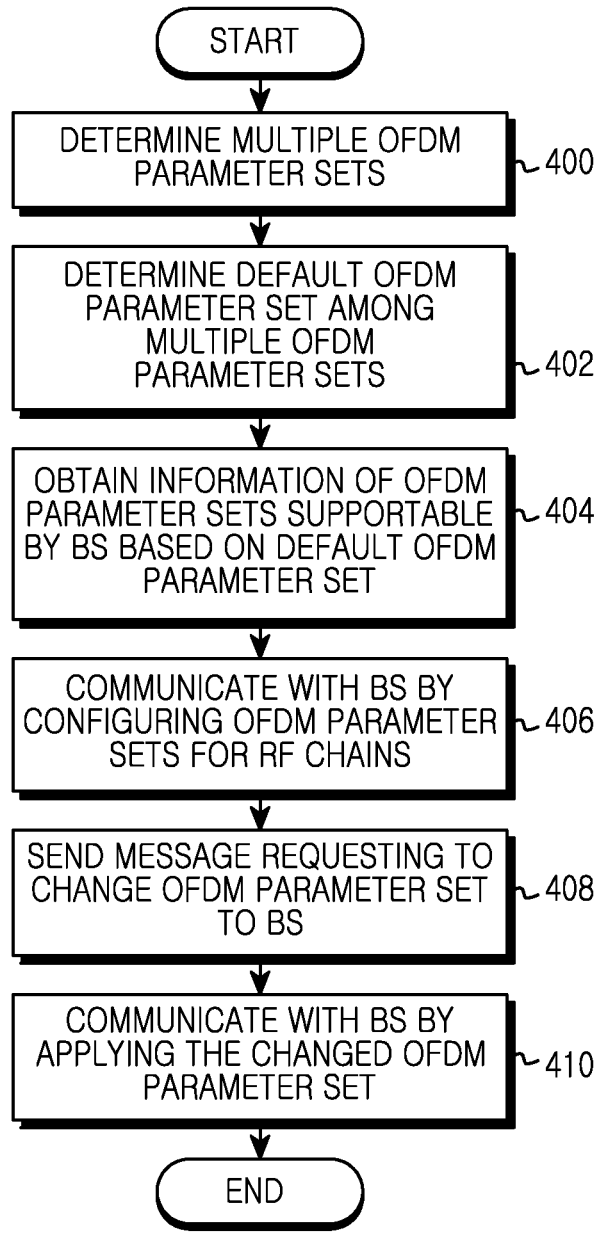
FIG. 4 is a flowchart illustrating MS operations for communicating in a wireless communication system supporting multiple OFDM parameter sets according to an embodiment of the present invention.

FIG. 4 is a flowchart illustrating MS operations for communicating in a wireless communication system supporting multiple OFDM parameter sets according to an embodiment of the present invention.

Referring to FIG. 4, in step 400, the MS determines multiple OFDM parameter sets, e.g., using Table 1. The multiple parameter sets can be determined by the operator or by the MS by collecting and using the statistical data of the channel condition or the statistical data of the moving speed.

In step 402, the MS determines a default UL OFDM parameter set from the multiple OFDM parameter sets. The default UL OFDM parameter set is determined as the OFDM parameter set having the greatest subcarrier spacing among the multiple OFDM parameter sets. While the OFDM parameter set of the greatest subcarrier spacing increases the overhead, the OFDM parameter set of the greatest subcarrier spacing can be supported by all of the MSs.

Additionally, the default DL OFDM parameter set of the BS can be the same as or different from the default UL OFDM parameter set of the MS.

In step 404, using the default UL OFDM parameter set, the MS obtains the information of the supportable OFDM parameter sets of the BS from the BS. For example, the MS receives the information of the supportable OFDM parameter sets of the BS using the default UL OFDM parameter set. Therefore, the information of the OFDM parameter sets supported by the BS can be included in the basic capability support negotiation during the network entry. Accordingly, both the MS and the BS can exchange the supported OFDM parameter sets in the network entry.

In step 406, the MS communicates with the BS by configuring the OFDM parameter sets for one or multiple RF chains based on the obtained OFDM parameter set information.

If necessary, the MS sends the OFDM parameter set change request message to the BS in step 408, and then receives changed OFDM parameter set information from the BS.

In step 410, the MS communicates with the BS using the changed OFDM parameter set.

Figure 5:
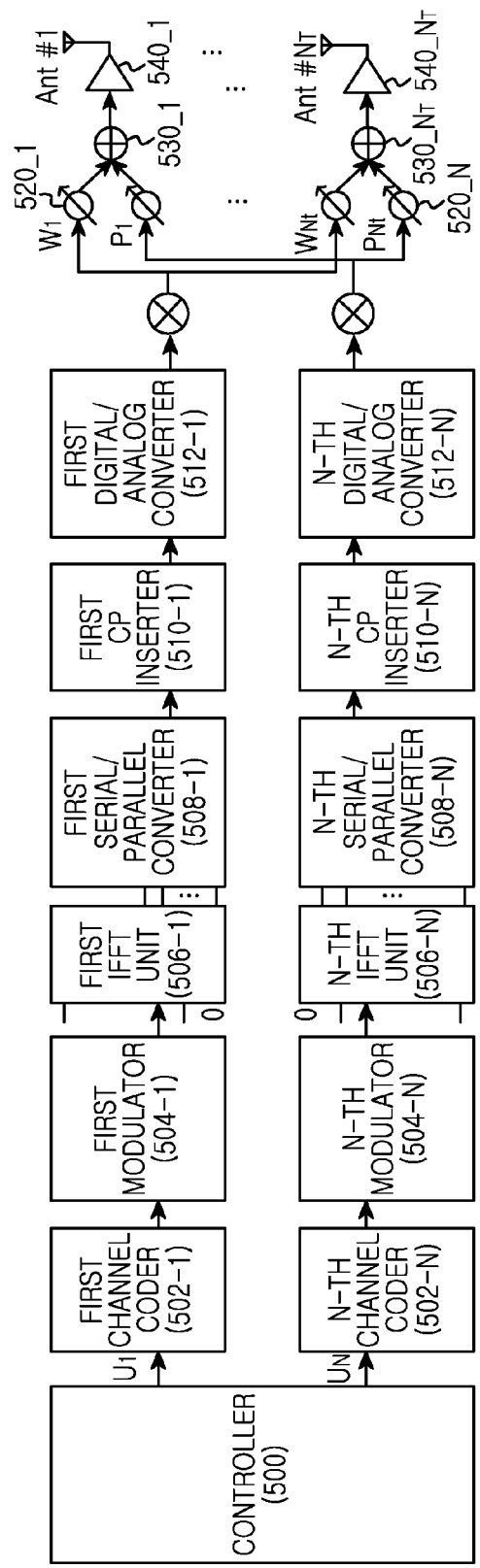
FIG. 5 is a block diagram illustrating a transmitting apparatus for communicating in a wireless communication system supporting multiple OFDM parameter sets according to an embodiment of the present invention.

FIG. 5 is a block diagram illustrating a transmitting apparatus for communicating in a wireless communication system supporting multiple OFDM parameter sets according to an embodiment of the present invention. Specifically, the transmitting apparatus in FIG. 5 may be included in the BS or the MS.

Referring to FIG. 5, the transmitting apparatus includes a controller 500, first through N-th channel coders 501-1 through 502-N, first through N-th modulators 504-1 through 504-N, first through N-th Inverse FFT (IFFT) units 506-1 through 506-N, first through N-th serial/parallel converters 508-1 through 508-N, first through N-th CP inserters 510-1 through 510-N, first through N-th digital/analog converters 512-1 through 512-N, first through N-th beamformers 520_1 through 520_N, first through $N_T$ adders 530_1 through 530_$N_T$, and a plurality of antennas 540_1 through 540_$N_T$.

The controller 500, e.g., a protocol controller, controls the operations of the transmitting apparatus. The controller 500 provides information for the protocol processing to a corresponding component of a physical layer, or issues a control signal to the corresponding component of the physical layer.

In addition, the controller 500 determines the OFDM parameter sets to apply to the respective RF chains and applies an OFDM parameter value of the corresponding OFDM parameter set to the corresponding component.

For example, a first RF chain includes the first channel coder 502-1, the first modulator 504-1, the first IFFT unit 506-1, the first serial/parallel converter 508-1, the first CP inserter 510-1, and the first digital/analog converter 512-1. Likewise, an N-th RF chain includes the N-th channel coder 502-N, the N-th modulator 504-N, the N-th IFFT unit 506-N, the N-th serial/parallel converter 508-N, the N-th CP inserter 510-N, and the N-th digital/analog converter 512-N. The corresponding RF chain is a process chain for forming the beam of the corresponding MS. One MS and one RF chain can be mapped, or one MS and multiple RF chains can be mapped. That is, the controller 500 determines the mapping of the MS and one or more RF chains through scheduling.

The RF chains can be divided logically or physically. That is, hardware of the channel coder, the modulator, the IFFT unit, the serial/parallel converter, the CP inserter, and the digital/analog converter, can be provided for each RF chain, or the multiple RF chains can be logically configured in the single transmitter including the channel coder, the modulator, the IFFT unit, the first serial/parallel converter, the first CP inserter, and the digital/analog converter.

The first through N-th channel coders 501-1 through 502-N receive control information bits or data information bits from the controller 505, apply a preset coding scheme to the bits, and output the coded bits to the first through N-th modulators 504-1 through 504-N. For example, the coding scheme utilizes turbo coding or convolutional coding.

The first through N-th modulators 504-1 through 504-N modulate the coded bits output from the first through N-th channel coders 501-1 through 502-N, to symbols using a preset modulation scheme, and output the modulated symbols to the first through N-th IFFT units 506-1 through 506-N. For example, the modulation scheme utilizes Quadrature Phase Shift Keying (QPSK) or 16 Quadrature Amplitude Modulation (QAM).

The first through N-th IFFT units 506-1 through 506-N apply N-point IFFT to the modulated symbols output from the first through N-th modulators 504-1 through 504-N, and output the symbols to the first through N-th serial/parallel converters 508-1 through 508-N. The IFFT size of each RF chain is determined by the controller 500.

The first through N-th serial/parallel converters 508-1 through 508-N serial/parallel convert the signals output from the first through N-th IFFT units 506-1 through 506-N, and output the converted signals to the first through N-th CP inserters 510-1 through 510-N. The first through N-th CP inserters 510-1 through 510-N insert a guard interval signal to the signals output from the first through N-th serial/parallel converters 508-1 through 508-N and output the signals to the first through N-th digital/analog converters 512-1 through 512-N.

Herein, the guard interval is inserted to remove interference between the OFDM symbol transmitted in a previous OFDM symbol time and a current OFDM symbol to transmit in the current OFDM symbol time when the OFDM symbols are transmitted in the OFDM communication system. The CP length of each RF chain is determined by the controller 500.

The first through N-th digital/analog converters 512-1 through 512-N convert the signals output from the first through N-th CP inserters 510-1 through 510-N, to analog signals.

The output signals of the first through N-th digital/analog converters 512-1 through 512-N are RF-processed by components such as filters (not shown) and front end units (not shown) to be transmittable over the air, and then fed to an antenna stage.

The antenna stage includes the beamformers 520_1 to 520_N, the adders 530_1 to 530_$N_T$, and the antennas 540_1 to 540_$N_T$. $N_T$ indicates the number of transmit antenna. The beamformers 520 form beams transmitted in a particular direction by controlling phase and amplitude of multiple antenna elements. The adders 530 combine the RF signals of the multiple RF chains and outputs the added signals to the corresponding transmit antennas 540.

Each RF chain is connected to part or all of the transmit antennas and uses analog beamforming to enhance signal quality.

As described above, the system performance can be optimized by supporting the multiple OFDM parameter sets in the wireless communication system.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A communication method of a Base Station (BS) in a wireless communication system, the communication method comprising:

transmitting, to at least one Mobile Station (MS) from the BS, information of all supported Orthogonal Frequency Division Multiplexing (OFDM) parameter sets in a cell from among a plurality of OFDM parameter sets, using a default OFDM parameter set;

selecting, by the BS, at least one OFDM parameter set for the at least one MS, from among the supported OFDM parameter sets, based on one of a channel state and a mobility of the at least one MS responsive to the default OFDM parameter set communication; and performing, by the BS, data communication with the at least one MS through the at least one selected OFDM parameter set, wherein each of the plurality of OFDM parameter sets comprises a different combination of parameter values representing an Inverse Fast Fourier Transform (IFFT) size, a Cyclic Prefix (CP) length, a subcarrier spacing, and a symbol duration, and wherein the default OFDM parameter set has a greatest subcarrier spacing among the plurality of OFDM parameter sets.

2. The communication method of claim 1, wherein transmitting the information of the supported OFDM parameter sets further comprises:

broadcasting the information of the supported OFDM parameter sets over a broadcast channel to the at least one MS.

3. The communication method of claim 1, wherein transmitting the information of the supported OFDM parameter sets further comprises:

transmitting the information of the supported OFDM parameter sets to the at least one MS through basic capability support negotiation during a network entry.

4. The communication method of claim 1, further comprising:

determining whether a change of an OFDM parameter set is necessary, based on one of the channel state and the mobility of the at least one MS; and transmitting, to the at least one MS, information of a changed OFDM parameter set.

5. The communication method of claim 1, further comprising:

receiving an OFDM parameter set change request from the at least one MS;

determining a changed OFDM parameter set to be used by the at least one MS; and transmitting the changed OFDM parameter set to the at least one MS.

6. The communication method of claim 1, wherein selecting the at least one OFDM parameter set further comprises:

if the at least one MS includes a plurality of radio frequency (RF) chains, selecting multiple OFDM parameter sets for the at least one MS, each of the multiple OFDM parameter sets corresponding to a respective one of the plurality of RF chains; and if the at least one MS includes one RF chain, selecting one OFDM parameter set for the at least one MS.

7. A communication method of a Mobile Station (MS) in a wireless communication system, the communication method comprising:

receiving, from a Base Station (BS) at the MS, information of all supported Orthogonal Frequency Division Multiplexing (OFDM) parameter sets in a cell from among a plurality of OFDM parameter sets, using a default OFDM parameter set; and performing, by the MS, data communication with the BS through at least one OFDM parameter set selected from the supported OFDM parameter sets based on one of a channel state and a mobility of the MS responsive to the default OFDM parameter set communication, wherein each of the plurality of OFDM parameter sets comprises a different combination of parameter values representing an Inverse Fast Fourier Transform (IFFT) size, a Cyclic Prefix (CP) length, a subcarrier spacing, and a symbol duration, and wherein the default OFDM parameter set has a greatest subcarrier spacing among the plurality of OFDM parameter sets.

8. The communication method of claim 7, wherein receiving the information of the supported OFDM parameter sets further comprises:

receiving the information of the supported OFDM parameter sets from the BS over a broadcast channel.

9. The communication method of claim 7, wherein receiving the information of the supported OFDM parameter sets further comprises:

receiving the information of the supported OFDM parameter sets from the BS through basic capability support negotiation during a network entry.

10. The communication method of claim 7, further comprising selecting the at least one OFDM parameter set from among the supported OFDM parameter sets, wherein selecting the at least one OFDM parameter set comprises:

if the MS includes a plurality of radio frequency (RF) chains, selecting multiple OFDM parameter sets from among the supported OFDM parameter sets, each of the multiple OFDM parameter sets corresponding to a respective one of the plurality of RF chains; and if the MS includes one RF chain, selecting one OFDM parameter set from among the supported OFDM parameter sets.

11. The communication method of claim 7, further comprising:

receiving, from the BS, information of a changed OFDM parameter set; and communicating with the BS through the changed OFDM parameter set.

12. The communication method of claim 7, further comprising:

transmitting an OFDM parameter set change request to the BS;

receiving, from the BS, information of a changed OFDM parameter set; and communicating with the BS through the changed OFDM parameter set.

13. A communication apparatus of a Base Station (BS) in a wireless communication system, the communication apparatus comprising:

a controller configured to select all supported Orthogonal Frequency Division Multiplexing (OFDM) parameter sets of a cell from among a plurality of OFDM parameter sets communicated via a default OFDM parameter set, and the controller is further configured to subsequently select at least one OFDM parameter set for at least one Mobile Station (MS), from among the supported OFDM parameter sets, based on one of a channel state and a mobility of the at least one MS responsive to the default OFDM parameter set; and a transceiver configured to transmit, to the at least one MS, information of the supported OFDM parameter sets of the cell, using the default OFDM parameter set, and perform data communication with the at least one MS through the subsequently selected at least one OFDM parameter set, wherein each of the plurality of OFDM parameter sets comprises a different combination of parameter values representing an Inverse Fast Fourier Transform (IFFT) size, a Cyclic Prefix (CP) length, a subcarrier spacing, and a symbol duration, and wherein the default OFDM parameter set has a greatest subcarrier spacing among the plurality of OFDM parameter sets.

14. The communication apparatus of claim 13, wherein the transceiver is further configured to transmit the information of the supported OFDM parameter sets to the at least one MS by broadcasting the information of the supported OFDM parameter sets over a broadcast channel.

15. The communication apparatus of claim 13, wherein the transceiver is further configured to transmit the information of the supported OFDM parameter sets to the at least one MS by transmitting the information of the supported OFDM parameter sets to the at least one MS through basic capability support negotiation during a network entry.

16. The communication apparatus of claim 13, wherein the controller is further configured to:
if the at least one MS includes a plurality of radio frequency (RF) chains, select multiple OFDM parameter sets for the at least one MS, each of the multiple OFDM parameter sets corresponding to a respective one of the plurality of RF chains; and
if the at least one MS includes one RF chain, select one OFDM parameter set for the at least one MS.

17. The communication apparatus of claim 13, wherein:
the controller is further configured to determine whether a change of an OFDM parameter set is necessary, based on one of the channel state and the mobility of the at least one MS; and
the transceiver is further configured to transmit, to the at least one MS, information of a changed OFDM parameter set.

18. The communication apparatus of claim 13, wherein:
the transceiver is further configured to receive an OFDM parameter set change request from the at least one MS;
the controller is further configured to determine a changed OFDM parameter set to be used by the at least one MS; and
the transceiver is further configured to transmit the changed OFDM parameter set to the at least one MS.

19. A communication apparatus of a Mobile Station (MS) in a wireless communication system, the communication apparatus comprising:
a controller configured to determine all supported Orthogonal Frequency Division Multiplexing (OFDM) parameter sets of a cell from among a plurality of OFDM parameter sets as communicated via a default OFDM parameter set transmitted by a Base Station (BS), and the controller is further configured to subsequently select at least one OFDM parameter set from among the plurality of OFDM parameter sets based on one of a channel state and a mobility of the MS; and
a transceiver configured to receive, from the BS, the default OFDM parameter set, and perform data communication with the BS through the at least one subsequently selected OFDM parameter set, wherein each of the plurality of OFDM parameter sets comprises a different combination of parameter values representing an Inverse Fast Fourier Transform (IFFT) size, a Cyclic Prefix (CP) length, a subcarrier spacing, and a symbol duration, and wherein the default OFDM parameter set has the greatest subcarrier spacing among the plurality of OFDM parameter sets.

20. The communication apparatus of claim 19, wherein the transceiver is further configured to:
receive, from the BS, information of a changed OFDM parameter set; and
communicate with the BS through the changed OFDM parameter set.

21. The communication apparatus of claim 19, wherein the transceiver is further configured to receive the information of the supported OFDM parameter sets by receiving the information of the supported OFDM parameter sets from the BS over a broadcast channel.

22. The communication apparatus of claim 19, wherein the transceiver is further configured to receive the information of the supported OFDM parameter sets by receiving the information of the supported OFDM parameter sets from the BS through basic capability support negotiation during a network entry.

23. The communication apparatus of claim 19, wherein the selection of the at least one OFDM parameter set from among the supported OFDM parameter sets by the controller further comprises:
if the MS includes a plurality of radio frequency (RF) chains, select multiple OFDM parameter sets from among the supported OFDM parameter sets, each of the multiple OFDM parameter sets corresponding to a respective one of the plurality of RF chains; and
if the MS includes one RF chain, select one OFDM parameter set from among the supported OFDM parameter sets.

24. The communication apparatus of claim 19, wherein the transceiver is further configured to:
transmit an OFDM parameter set change request to the BS;
receive, from the BS, information of a changed OFDM parameter set; and
communicate with the BS through the changed OFDM parameter set.

* * * * *